(No Model.) 4 Sheets—Sheet 1.

F. C. DAMM.
MACHINE FOR MOLDING PLASTIC MATERIALS.

No. 406,707. Patented July 9, 1889.

WITNESSES,
Frank Miller.
N. J. Bainbridge

INVENTOR.
Frederick C. Damm
By Watson + Thurston
ATTORNEYS (No Model.) 4 Sheets—Sheet 2.

F. C. DAMM.
MACHINE FOR MOLDING PLASTIC MATERIALS.

No. 406,707. Patented July 9, 1889.

WITNESSES,
Frank Miller.
H. J. Bainbridge

INVENTOR.
Frederick C. Damm
By Watson & Thurston
ATTORNEY.

(No Model.)  4 Sheets—Sheet 3.

F. C. DAMM.
MACHINE FOR MOLDING PLASTIC MATERIALS.

No. 406,707.  Patented July 9, 1889.

WITNESSES.  
Frank Miller  
H. J. Bainbridge

INVENTOR.  
Frederick C. Damm  
By Watson & Thurston  
ATTORNEYS (No Model.) 4 Sheets—Sheet 4.
F. C. DAMM.
MACHINE FOR MOLDING PLASTIC MATERIALS.
No. 406,707. Patented July 9, 1889.
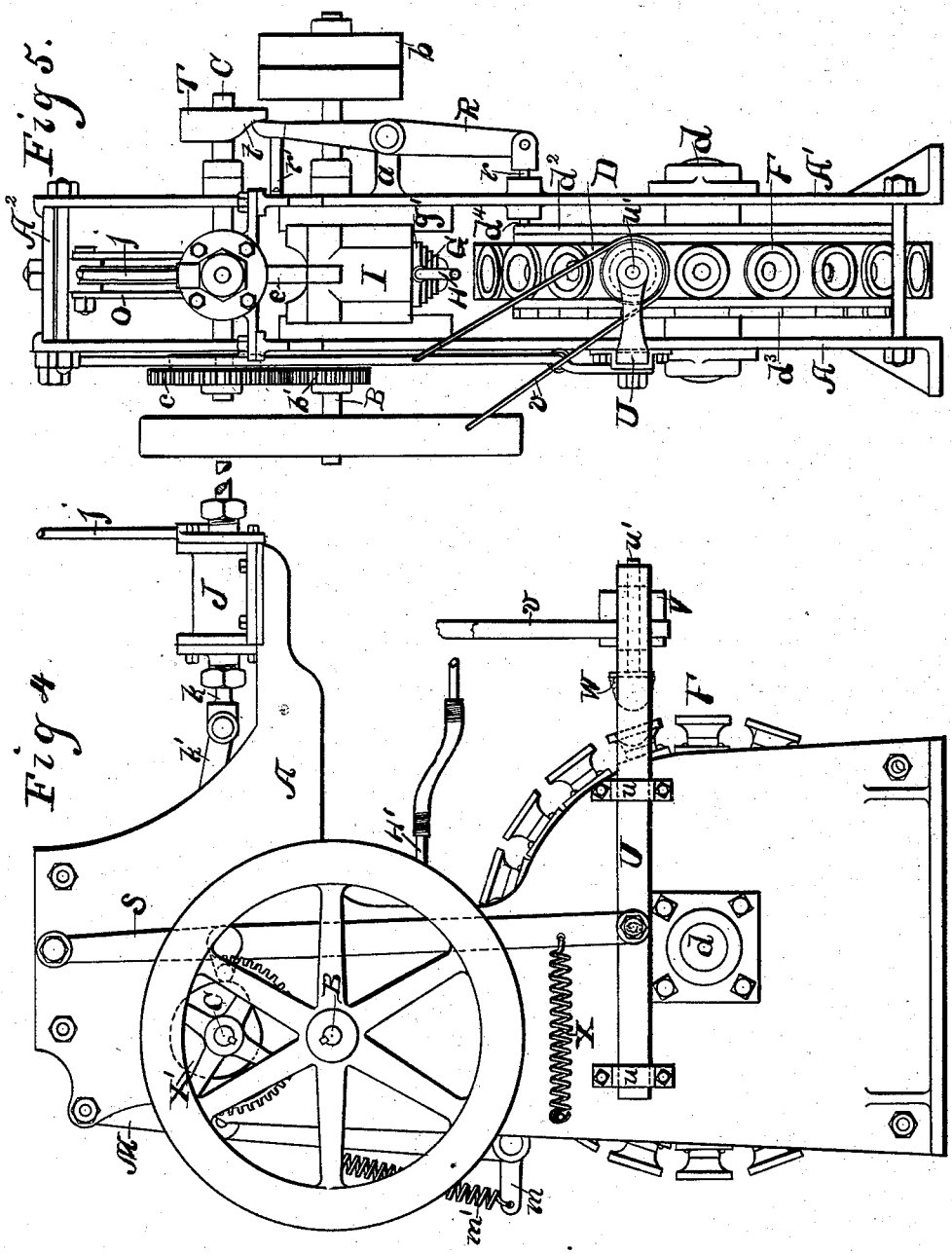
WITNESSES:
Frank Miller.
N. J. Bainbridge
INVENTOR:
Frederick C. Damm
BY Watson + Thurston
ATTORNEYS.

UNITED STATES PATENT OFFICE.

FREDRICK C. DAMM, OF CLEVELAND, OHIO.

MACHINE FOR MOLDING PLASTIC MATERIALS.

SPECIFICATION forming part of Letters Patent No. 406,707, dated July 9, 1889.

Application filed August 7, 1888. Serial No. 282,170. (No model.)

*To all whom it may concern:*

Be it known that I, FREDRICK C. DAMM, a citizen of the United States, residing at Cleveland, in the county of Cuyahoga and State of Ohio, have invented certain new and useful Improvements in Machines for Molding Plastic Materials, of which the following is a full, clear, and exact description, reference being had to the accompanying drawings, in which—

Figure 1:
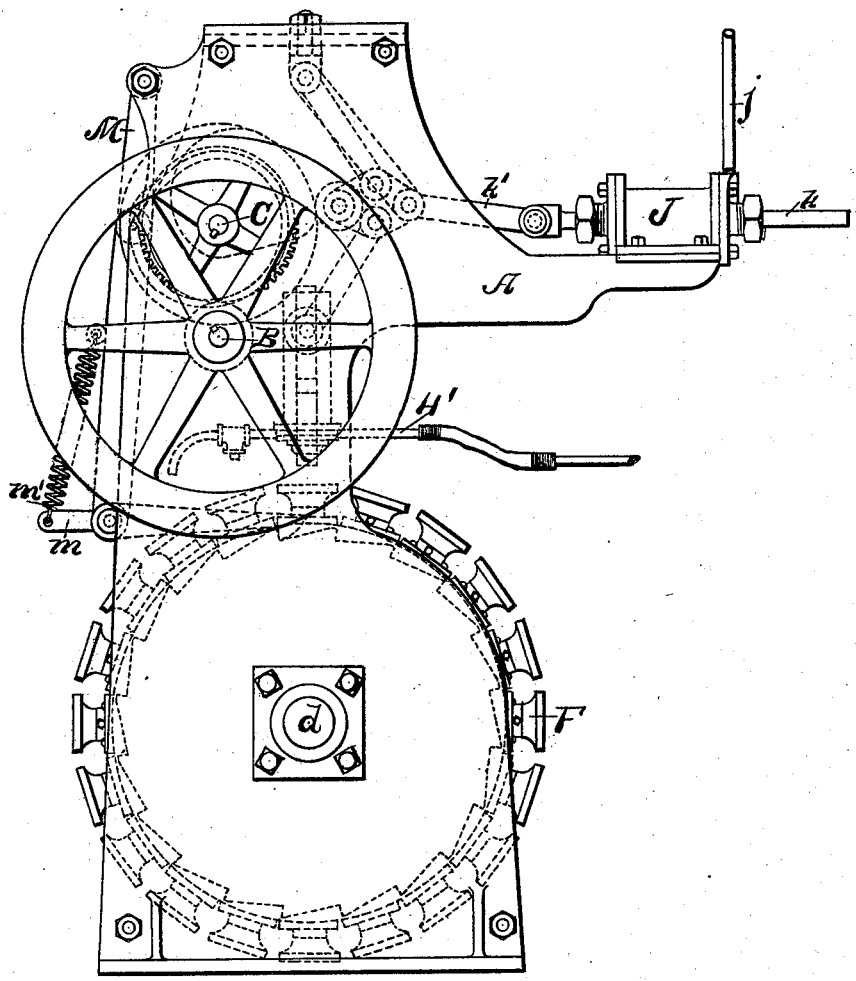
Figure 2:
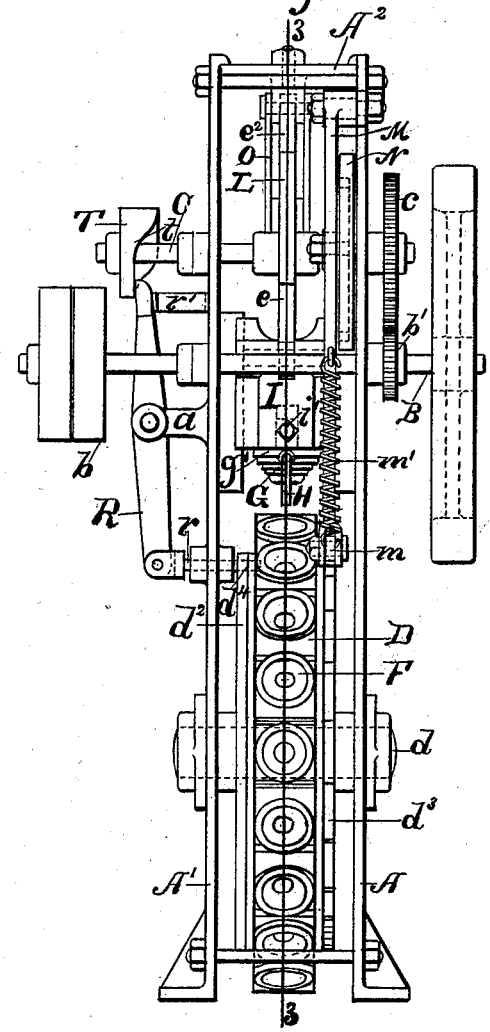
Figure 3:
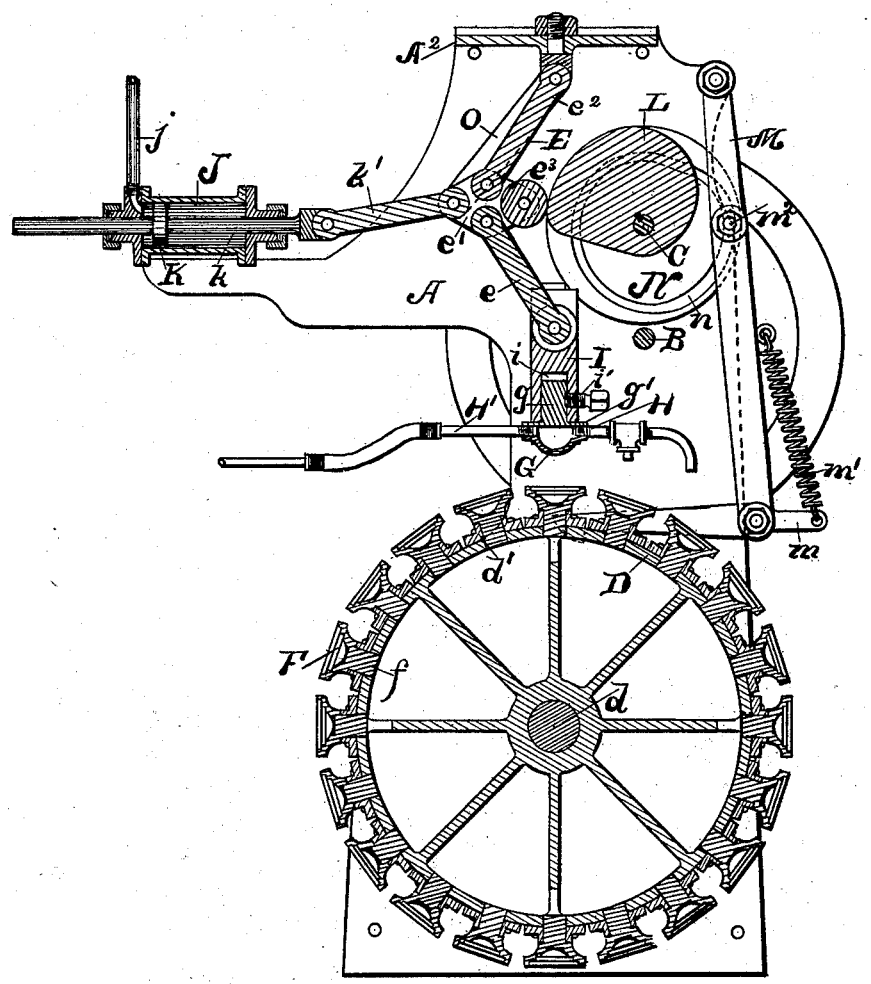

Figure 1 is a side elevation of my improved machine. Fig. 2 is a rear elevation thereof. Fig. 3 is a sectional view on the line 3 3 in Fig. 2. Fig. 4 is a side elevation, and Fig. 5 a front elevation, of the same machine provided with an automatic sponging apparatus for drying the molds.

Like letters represent the same parts in the several figures.

My invention relates to machines which are particularly adapted to pressing into the desired shape such plastic compositions as are now most extensively used in the manufacture of flying targets—that is to say, compositions which are plastic when heated and which harden when cold.

The drawings illustrating my invention represent a machine equipped for making such flying targets; but provision is made for changing the molds and die, so that other articles may be made thereon with equal facility.

The objects of my invention are to provide a machine of increased capacity and durability, simple in construction, and as nearly automatic in its action as practicable.

To this end it consists in the construction, combination, and arrangement of the parts, as herein shown and described, and particularly pointed out in the claims.

Referring to the drawings, which, as before indicated, represent the best embodiment of my invention for the purpose named, the frame will be seen to consist of two side supports A A′, which are secured to a suitable bed, and a top plate A², connecting the upper ends thereof. Journaled in said frame is a horizontal shaft B, to which is secured the driving-pulley $b$. A second shaft C is journaled above the first, and motion is transmitted from one to the other by means of the gears $c$ and $b'$.

D represents a wheel secured to a horizontal shaft $d$, which is also journaled in said frame. In the face of this wheel are formed a series of sockets $d'$, in which are secured the shanks $f$ of the intaglio dies or "molds" F, as I prefer to call them, which project radially from the face of said wheel. On one side of this wheel are as many ratchet-teeth $d^3$ as there are molds, and in a plate $d^2$, bolted to the outer side of the wheel, there is formed an equal number of holes or sockets $d^4$.

I represents a cross-head, which is adapted to be moved up and down, and is guided in said movement by tongues and grooves on the supports A A′ and said cross-head, respectively. This cross-head is provided with a socket $i$, into which the shank $g$ of a die is inserted, where it is retained by set-screw $i'$.

The mechanism whereby the reciprocating up-and-down movement is imparted to the cross-head I and die G secured thereto consists of a toggle E. One arm $e$ of this toggle is pivoted at its lower end to the cross-head I and at its upper end between two toggle-plates $e'$. The other arm $e^2$ is pivoted to the said plates $e'$ at its lower end and to the plate A² at its upper end. Upon the outside of each of said plates $e'$ is pivoted an arm O, the upper end of which is pivoted to the top plate A². The purpose of these arms O is to prevent the toggle-plates $e'$ from turning and thereby affecting the even operation of the toggle.

J represents a cylinder secured to the frame, and K a piston-head operating in same. Steam, air, water, or any other liquid under pressure is admitted to the cylinder through a pipe $j$, and exerts a continuing pressure against the same. The piston-rod $k$ extends through both ends of said cylinder, for the purpose of steadying its movement, and one end is connected by link $k'$ to the plate $e'$. By this arrangement of parts the pressure from the cylinder is always acting to straighten the toggle and thereby move the die G downward. The up or return movement of the die G is produced by means of the cam L, which is keyed to the shaft C and which bears against a friction-wheel $e^3$, journaled to the plates $e'$.

M represents a bar pivoted at its upper end to the support A. A pawl $m$ is pivoted between its ends to the lower end of the bar M, and is arranged to engage with ratchet-teeth $d^3$ on the wheel D. A contractile coiled spring $m'$ is stretched between the outer end of said pawl and the bar M, whereby the pawl is held continually in engagement with said ratchet-teeth. Secured to the shaft C is a wheel M, having on one side a cam-groove $n$, and a pin $m^2$, projecting from the bar M, is held in said groove. By this means the revolution of the wheel N causes a backward and forward movement of the bar M at regular intervals, whereby the wheel D is intermittently revolved the distance between two contiguous molds on its face.

The wheel D is held firmly, while the die G descends into the mold beneath it, by the following mechanism. A lever R is pivoted to an arm $a$, which is secured to the support A'. To the lower end of this lever is pivotally connected a pin $r$, which passes through the support A' and engages at the proper time with the sockets $d^4$ in the side of the wheel D. A constant pressure is exerted against the lever R to hold said pin in said sockets by a spring $r'$, which is shown in the drawings as a flat spring bent between the upper end of the lever R and the support A'. Secured to the shaft C outside of the lever R is a wheel T, having a side cam $t$, which bears against the upper arm of said lever R and in its revolution forces in said upper arm, and thereby disengages the pin $r$ from the wheel D, and then permits the spring $r'$ to force said pin into engagement therewith.

When the parts above explained are assembled as shown, the operation of the machine is as follows: As the shaft C, carrying the cam-wheels T, N, and L, is revolved, the toggle-plate $e'$ is permitted to move backward by the recession of the cam L, and is so moved by the pressure against the piston K through the connecting parts. This forces the die G downward into the mold beneath it, into which the plastic material has been placed, and the same is pressed into the proper shape.

As the cam L continues to revolve, it presses against the friction-wheel $e^3$ and bends the toggle backward, thereby lifting the die. When the die begins its upward movement, the side cam $t$ draws the pin $r$ out of the retaining-socket in the wheel D and permits the same to be moved. Immediately the cam N moves the bar M, and the pawl $m$, being in engagement with the ratchet $d^3$, revolves the wheel D until the next mold is beneath the die. By this time the cam $t$ has so far revolved that the spring $r'$ is permitted to move the lever R and force the retaining-pin $r$ into engagement with the wheel, when the above-described operation is repeated.

In the manufacture of articles from mixtures which are made plastic by heat it is necessary that the die and molds be kept as cool as possible, so that the plastic material shall be hardened as soon as possible, and for the further reason that the material may not stick to the die and molds. I accomplish this result by forming a recess in the die G, leaving the walls as thin as consistent with the necessary strength, and fastening to said die over said recess a plate $g'$. Suitable packing may be interposed between the recessed die and the plate $g'$, and said plate may be secured in place by bolts or other approved means, whereby said recess is completely inclosed and the escape of liquid therefrom, except through the pipe H, is prevented. The shank $g$ of the die projects from and is made integral with the plate $g'$ above mentioned. A pipe H' leads into said recess, whereby water or other cooling material is forced into the same under sufficient pressure to insure that the water passing through it shall remain cold enough to keep the die cold. An outlet-pipe H leads from said recess, and is so shaped that the water is discharged directly into one or more of the molds containing the molded article, whereby said articles are cooled and "set," so that they may be removed after two or three movements of the wheel D, and the molds are also cooled for the next operation.

If the recess in the die were not confined by the top plate, the passage of the water through it would be productive of some good results; but no pressure could be used to force it through quickly, and the water would, by reason of its slow movement, become gradually heated, so that in time it would have little or no effect in cooling the die. The result of this condition of things would be that the material would stick to the die and molds, and the material would not be cooled enough to hold its shape after the die was removed.

Several distinct advantages over other possible methods results from the arrangement of the molds on the edge of a vertical wheel. First, the pressure of the die is axial and is borne by the shaft of the wheel, and there is no tendency to bend or distort the wheel, as there would be if the molds projected vertically from a horizontal wheel. Again, when, as in this machine, water is used to cool the molded article, the molds will become partly filled therewith; but in the revolution of the wheel the molds become inverted and the water is drained out, while in machines where the molds remain vertical this water has to be sponged out or removed in some other manner. In this machine it is better to use a sponge, not to remove any considerable amount of water, but to dry the molds of the drops which adhere thereto. In order that this may be done automatically, I hang a bar S to a pivot on the outside of the side support A and connect its lower end to sliding bar U, which slides horizontally in the straps $u$. Upon the outer end of the bar U, which is bent around in front of the molds on the wheel D, is a revolving spindle $u'$, to which is secured a small pulley V, which is driven by a belt $v$. On the inner end of this spindle is secured a swab W. A contractile spring X is stretched between the lower part of the bar S and stud on the support A, and acts to draw the bar U forward until the revolving swab enters one of the molds, and in revolving wipes it dry. A cam X' on the shaft C, pushing against the bar U, moves said swab out of the mold just before the movement of the wheel D begins, and permits the spring X to draw it into the mold just after the wheel has finished its movement. The movement of the swab into the mold by spring force permits the use of the same swab until it is entirely worn out, because the spring will always draw it into the mold as far as it will go.

In the foregoing description I have confined myself, for the most part, to a description of the particular machine shown, which is, as I believe, the best embodiment of my invention; but I believe that various modifications of the machine as therein shown, some involving invention and some the result of mere mechanical skill, may be made in said machine, while still embodying parts of the invention herein shown; but I have not intended, nor do I wish to be understood, from the description, as imposing any further limitation upon the invention than as distinctly expressed in the claims.

Having thus described my invention, what I claim as new, and desire to secure by Letters Patent, is—

1. In a machine for molding plastic material, the combination of a vertical wheel and mechanism for imparting to said wheel an intermittent movement and for holding it firmly while the material is being pressed to shape, with a reciprocating hollow die, outlet and inlet pipes to said die, whereby a cooling-fluid may be kept constantly circulating through said die, said outlet-pipe being arranged to discharge said fluid into one or more of the molds containing the molded articles, substantially as and for the purpose specified.

2. In a machine for molding plastic material, a die consisting of a recessed bottom part, a plate secured to said bottom part and having a shank integral therewith, and orifices leading to said recess for the attachment of outlet and inlet pipes, substantially as and for the purpose specified.

3. In a machine for molding plastic material, the combination of a vertical wheel having molds secured radially to the face thereof, and mechanism for imparting to said wheel an intermittent movement and for holding it firmly while the material is being pressed into shape, a reciprocating die having an inclosed recess, and outlet and inlet pipes to said recess, whereby a fluid may be forced through said recess under pressure, the outlet-pipe being so formed that it will discharge said fluid into one or more of the molds containing the molded articles, substantially as and for the purpose specified.

4. In a machine for molding plastic material, a vertical wheel having a series of molds on the edge thereof and having a series of ratchet-teeth on said edge, with a grooved cam, a pivoted bar, a pin secured to said bar and operating in the groove of said cam, and a pawl pivoted to said bar, substantially as and for the purpose specified.

5. In a machine for molding plastic material, the combination of a reciprocating die, a vertical wheel carrying a series of molds and having a plate secured to the side thereof, said plate being provided with sockets $d^4$, and mechanism for revolving said wheel intermittently, with lever, a pin for engaging said sockets, and a cam for moving said lever in one direction and a spring for moving it in the opposite direction, substantially as and for the purpose specified.

6. In a machine for molding plastic material, the combination of a cross-head and means for guiding the same, and a die secured thereto, with a toggle, a cylinder, piston and piston-rod, a link connecting said toggle and piston-rod, and cam L, substantially as and for the purpose specified.

7. In a machine for molding plastic material, a wheel and a series of molds secured thereto, combined with a revolving swab and mechanism for drawing said swab into and out of said molds, substantially as and for the purpose specified.

8. In a machine for molding plastic material, a wheel and a series of molds secured thereto, combined with a pivoted arm, a horizontal bar pivotally connected therewith, a revolving swab carrying spindle journaled in said bar, a spring for moving said arm in one direction, and a revolving cam for moving it in the opposite direction, substantially as and for the purpose specified.

FREDRICK C. DAMM.

Witnesses:
E. L. THURSTON,
W. J. BAINBRIDGE.